March 3, 1942. M. MEYER 2,275,266
APPARATUS FOR TREATING, PURIFYING, AND SEPARATING MOLTEN METALS
Filed April 26, 1940
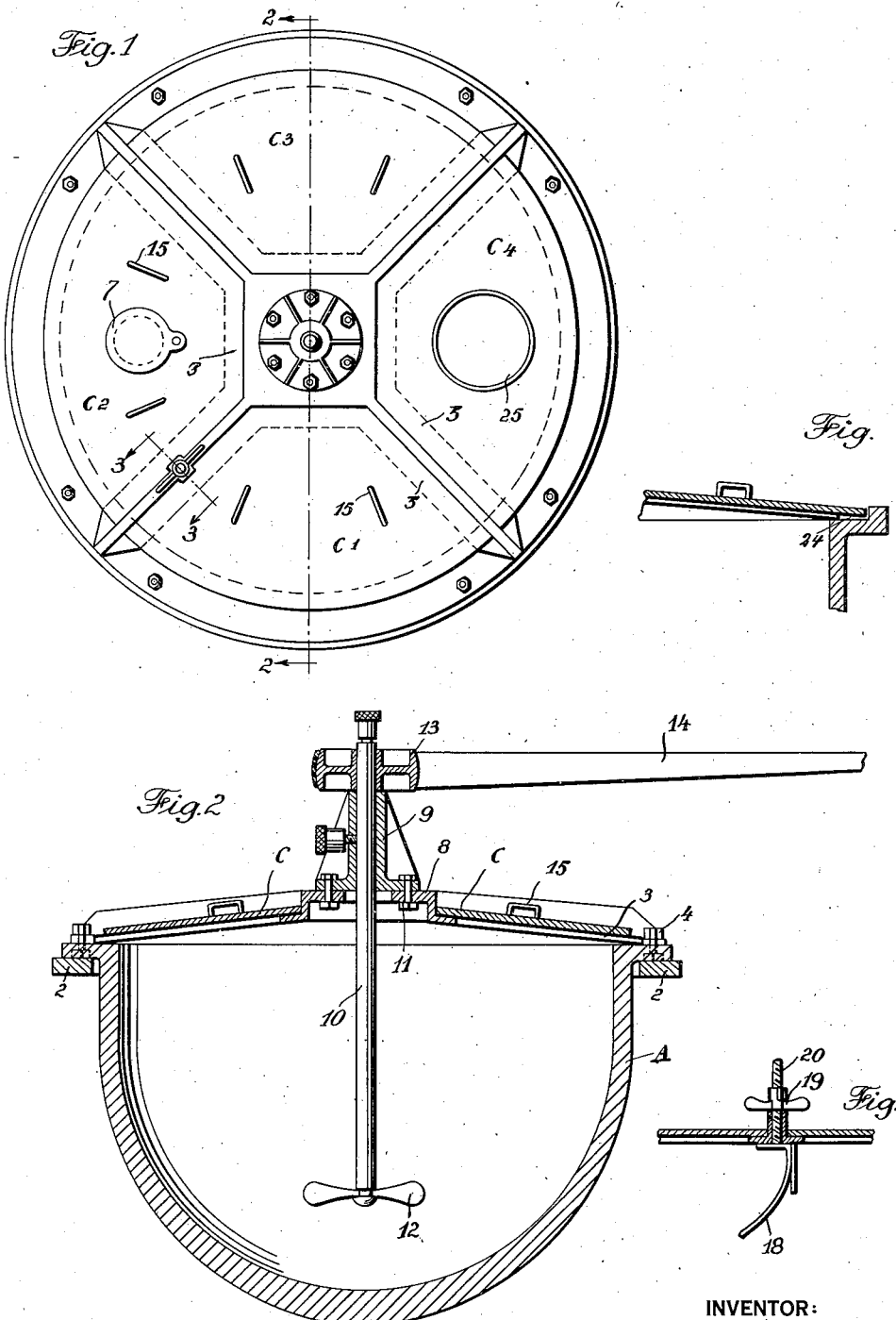
INVENTOR:
MAX MEYER
BY J. Friedman
ATTORNEY Patented Mar. 3, 1942

2,275,266

UNITED STATES PATENT OFFICE 2,275,266

APPARATUS FOR TREATING, PURIFYING, AND SEPARATING MOLTEN METALS

Max Meyer, New York, N. Y., assignor to Almac Metal Corporation, New York, N. Y.

Application April 26, 1940, Serial No. 331,723

1 Claim. (Cl. 266—34)

The invention relates to an apparatus for treating, refining, purifying and separating metals and their mixtures and alloys.

The treatment and particularly the purification or separation of these metals and their mixtures and alloys is generally carried-out in kettles which are either open at the top or are covered by hoods. Stirrers are used to agitate the molten bath.

In kettles having a stationary cover or hood the stirrer is introduced through a lateral aperture or door which also serves for the addition of chemicals.

Needless to state that only comparatively small stirrers having a small efficiency can be employed and that the working of the metals is unsatisfactory, as the bath and the added chemicals ought to be thoroughly incorporated into and uniformly diffused through the whole mass of the molten metals.

It is inevitable that obnoxious gases and vapours escape through the stirred door; on the other hand a continuous access of air is inevitable. Therefore an exact control of the work is made impossible, an accurate determination of the added chemicals is difficult and excessive formation of dross and oxides is unavoidable.

The hoods used for the purpose in question have a considerable height which causes the creation of a large air space of which the oxygen content is obnoxious for many and particularly reducing processes.

In open kettles heavy overhead structures or frames are used supporting the centrally located stirrer which is set upon the kettle and lifted therefrom together with the supporting structure.

The great drawback of this stirrer arrangement is that fumes, vapours and dust freely enter into the working spaces, that excessive oxidation of the metals cannot be prevented, that particularly the driving motor is exposed to the attacks of fumes or acids emerging from the kettle. Furthermore, it is inconvenient and costly to frequently put on and to remove the heavy stirrer structure.

Therefore the provision of stirrers in hood covered metal treating kettles has met with considerable difficulties. The disadvantages of the stirrer provided open and hood covered kettles are obviated by the invention.

It is therefore the object of the same to provide means for a thorough agitation of the molten charge by a combined stirrer hood structure whereby the agitation, the mounting and the removal of the stirrer may be practically obviated and, if required, can be effected in an extremely simple manner and without the application of stirrer sealing means.

It is a further object of the invention to provide a cover which allows an individual working of the charge and an individual control of the charge sections during operation.

It is a further object of the invention to seal the kettle in spite of thorough agitation and to practically prevent during operation the access of air.

It is also an object of the invention to reduce as much as possible the air or gas space above the surface of the metal bath hereby creating a desoxidising zone above the molten metal and reducing considerably the formation of oxides.

It is an object of the invention to introduce by single operations the charge into the kettle and to remove the molten metal without removing the hood stirrer structure.

Finally it is an important object of the invention to prevent any emergence of gases, fumes and dust from the kettle during the work, during the addition of chemicals or other reagents, during the removal of the molten metal and other operations and to maintain in the kettle a permanent draught.

With these and other objects in view an apparatus for carrying out this invention and the mode of its utilization will now be described in detail by way of example and will be illustrated in the accompanying drawing which diagrammatically shows a constructional form of the invention and of which Fig. 1 is a top view of the metal treating kettle, Fig. 2 is a vertical cross section of the same, Fig. 3 is a side view of a mixing baffle, Fig. 4 is a top view of a broken-away part of another form of the kettle.

Referring to the drawing A represent a metal treating kettle of approximately semicircular cross section. The kettle is supported by a cast iron ring 2 and provided with a hood or cover structure C.

The cover structure is a single casting and consists in the present form of the invention of a spider composed of four arms 3 which are secured to the kettle rim by bolts 4.

The arms 3 support with their inner end the thrust collar 9 of the agitator 10. The thrust collar 9 is fastened to the supporting structure C by bolts 11. The lower end of the agitator shaft carries a two blade propeller 12. On the upper end of the shaft a pulley 13 is provided which is driven by a belt 14. The arms 3 form the support for the hood consisting of four sections C1, C2, C3, C4. The sections C1, C2, C3 are removable and provided with handles 15. By the removal of the cover sections the corresponding bath sections located underneath are exposed to inspection and control. The cover section C4 is firmly connected with the supporting spider arms. It carries an aperture 25 which leads to the chimney.

Section C2 of the hood is provided with an aperture which is closed by a rotatable cover 7. This aperture is used for the introduction of additional substances to be used in the treatment of the charge.

A baffle 18 is fastened to one of the spider arms 3. It is vertically adjustable by means of hand nut 19 which can be moved up and down on the threaded bolt 20.

Hence it follows, that the difficulties encountered in kettles of the present type are obviated by the combined hood stirrer structure which represents a single constructional unit to be set on the tank and lifted therefrom by a single operation. The central stirrer is supported by the hood and needs no sealing means. Due to the draught exerted by the chimney and the application of the stirrer hood unit the escape of fumes, gases and dust is prevented even if the charging aperture is opened.

This hood supported stirrer makes it possible to locate the same at a point adjacent to the surface of the molten metal. Hereby the gas or air space above the metal surface is correspondingly reduced.

In Fig. 4 another form of the invention is shown.

The rim of the kettle is provided with an annular recess 24 which has a slightly greater diameter than the hood C. Therefore there is a small play created for the expansion of the hood and the danger of breakage is prevented.

The invention is not restricted to the cover stirrer structure described and shown in the drawings but embraces all modes of carrying-out the same by means of a combined cover stirrer unit.

I claim:

Apparatus for treating and refining molten metals comprising a treating kettle, a stirrer extending into the lower section of the kettle, mechanical driving means provided at the free end of the stirrer, a conical hood structure forming a kettle sealing, working and stirrer supporting unit consisting of a kettle supported multi-arm spider, at least one vertically adjustable mixing baffle fastened to said hood structure and extending into the upper zone of the kettle and a plurality of individual removable hood sections supported by said spider arms.

MAX MEYER.